Sept. 18, 1962  J. M. COLLINS  3,054,590
SECURING CLAMP FOR TRACTION DEVICE
Filed April 20, 1960  2 Sheets-Sheet 1

INVENTOR.
JOSEPH M. COLLINS
BY
*Wade Lootz*
*Sherman H. Goldman*
ATTORNEYS

Sept. 18, 1962 J. M. COLLINS 3,054,590
SECURING CLAMP FOR TRACTION DEVICE
Filed April 20, 1960 2 Sheets-Sheet 2

INVENTOR.
JOSEPH M. COLLINS
BY
ATTORNEYS

United States Patent Office 3,054,590
Patented Sept. 18, 1962

3,054,590
SECURING CLAMP FOR TRACTION DEVICE
Joseph M. Collins, 110 Poha Lane, H.V. 1,
Honolulu, Hawaii
Filed Apr. 20, 1960, Ser. No. 23,581
2 Claims. (Cl. 248—230)
(Granted under Title 35, U.S. Code (1952), sec. 266)

The invention described herein may be manufactured and used by or for the United States Government for government purposes without payment to me of any royalty thereon.

This invention relates generally to supporting structure for a portable traction device and, more particularly, to a supporting structure which enables the traction device secured thereto to be mounted on a variety of hospital equipment.

In my co-pending application, Serial No. 791,782, filed February 6, 1959, now Patent No. 3,009,461, for a Portable Traction Device, the clamping means is a spring device designed principally for attachment to parallel poles such as that of a common litter. The clamp means, which is the subject of this application, is unique in that it can be fitted to any type of cot, bed or litter, and when used with the spring type of traction device which is the subject of my co-pending application above referred to and an improvement thereof in my co-pending application, Serial No. 803,035, filed March 30, 1959, now Patent No. 2,997,250, it provides a very compact, lightweight, easily stored and transported surgical traction device.

It is an object of this invention, therefore, to provide a simple and practical clamp arrangement for attaching a support for a spring type surgical traction device to beds, cots or litters.

It is a further object to provide such a device which is economical to manufacture and is easily and quickly assembled for use.

It is a further object of this invention to provide such a device which is light in weight and easily packed, stored and transported.

It is a still further object to provide such a device which can be used equally well in the field on common litters and field hospital beds and in permanent hospitals on Stryker frames, Foster beds, Electric Circle beds, Balkan frames, and instrument stands.

The above and still other objects, advantages and features of my invention will become apparent upon consideration of the following detailed description of one embodiment thereof, especially when taken in conjunction with the accompanying drawings, in which.

Figure 1:
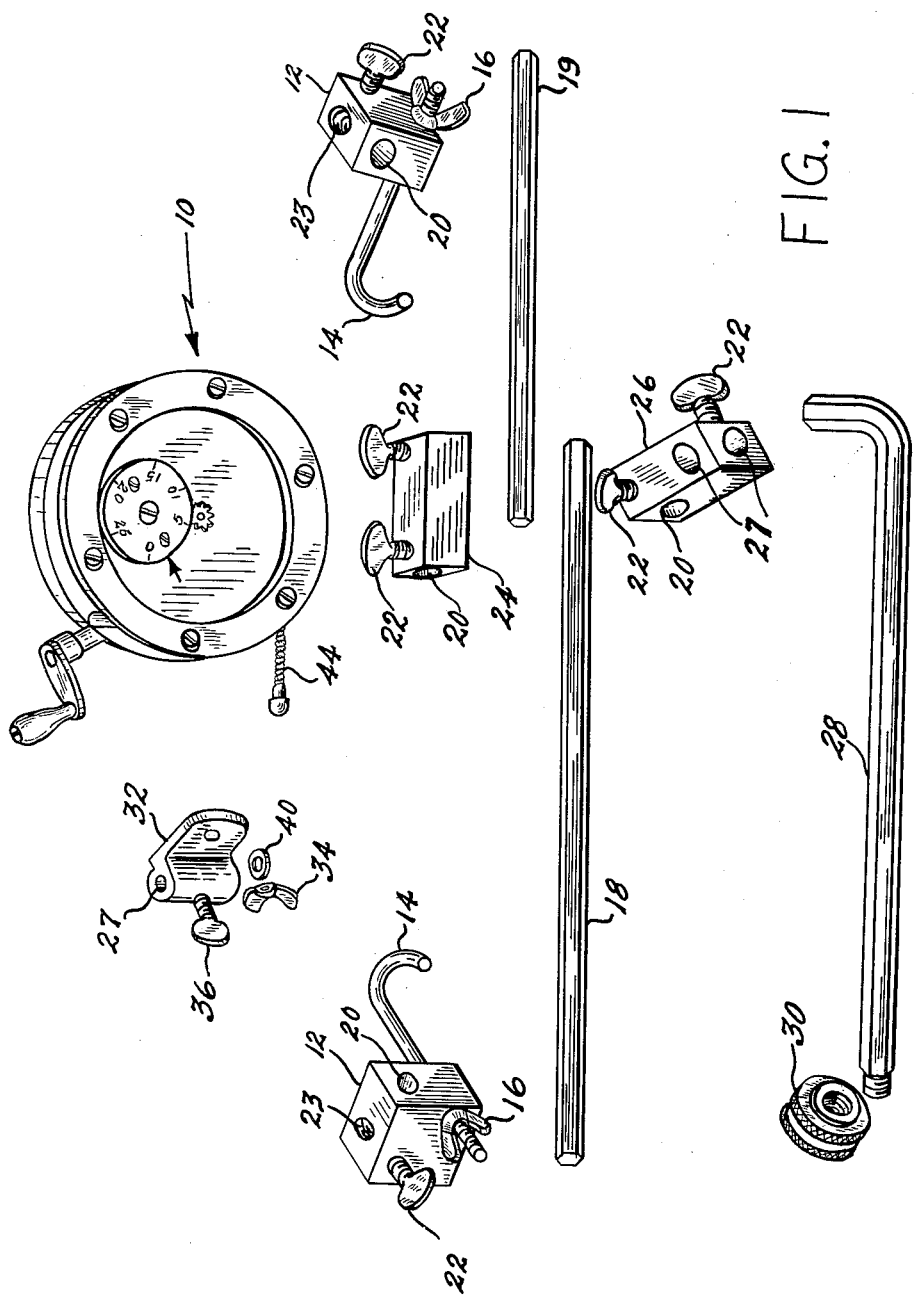
FIGURE 1 is an isometric view showing the essential elements of the invention.

Referring to FIGURE 1, 10 represents a traction device of the type described in my co-pending application, Serial No. 803,035, previously mentioned, to be attached to a bed, cot or litter. Two identical end blocks 12 are shown with J hooks 14 adjustable therein and capable of being tightened on poles or frames of litters or beds by wing nuts 16 in engagement with threaded portions of J hooks 14. A hole 20 is shown through blocks 12 of a size to pass a carriage bar 18 which can be clamped on said bar in any position by thumb screws 22. An extra hole 23 is shown in blocks 12 threaded to fit thumb screws 22 to permit fastening the said end blocks from a different angle. A shorter bar 19 is shown which can be used as an extension of bar 18 where greater length is required, as when it is desired for attachment to the poles of a common litter. The extension is made by securing one end of bar 18 in a suitable hole 20 in a union block 24 by a thumb screw 22. Extension bar 19 is secured in the opposite end of the said union block 24 in a similar manner to make the carriage bar the desired length. An adjustable carriage slide 26 has three holes, one designated as 20 to fit the said carriage bar 18, and two designated 27 (one perpendicular to the other) to fit an adjustable adapter bar 28. Adapter bar 28 has a short portion at one end bent at a right angle and the other end threaded to receive a safety nut 30, designed to prevent the traction device from slipping off said bar 28.

Two thumb screws 22 are shown, one of which secures the said carriage slide 26 in any position on the carriage bar 18 while the other permits the adjustment of adapter bar 28 to any position desired.

Figure 2:
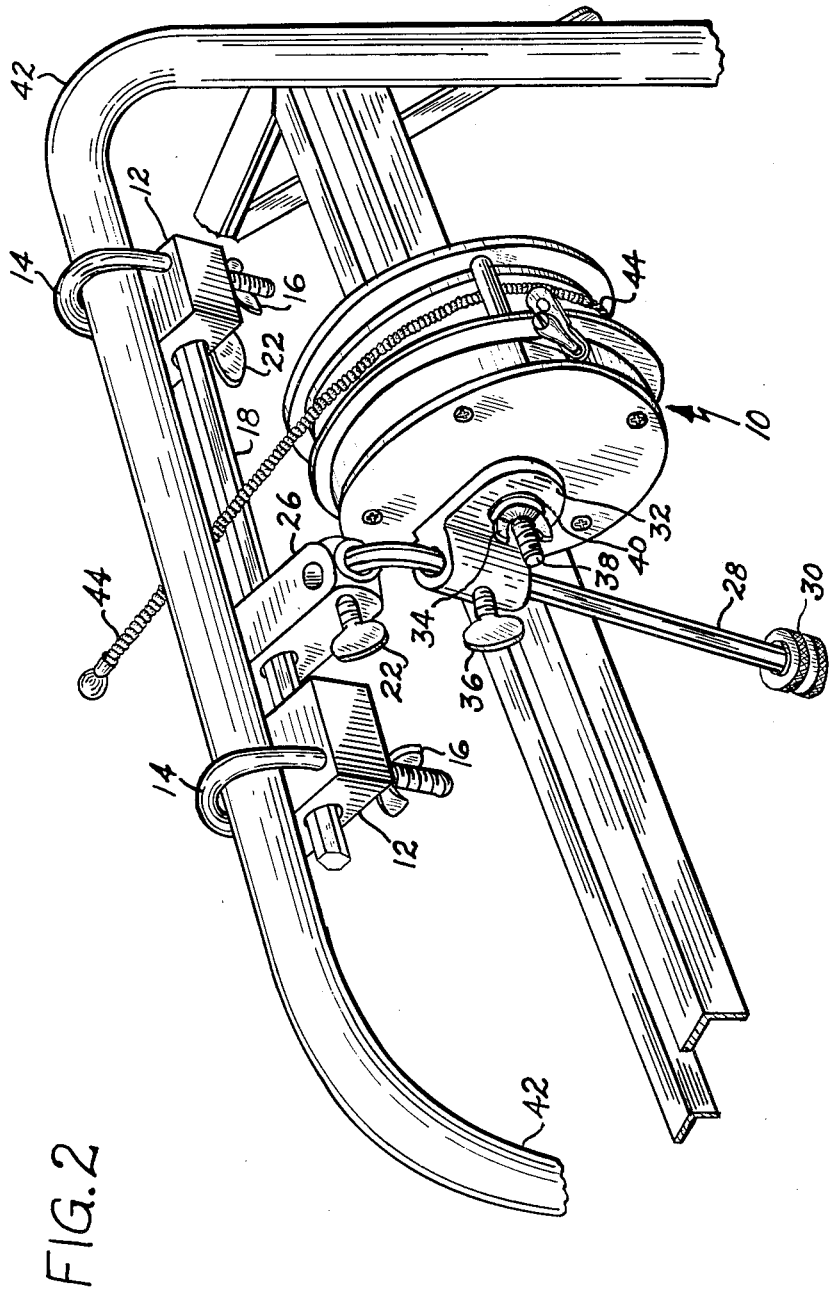
FIGURE 2 is an isometric view showing the invention attached to a bed.

As best seen in FIGURE 2, the device is attached to a bed as follows: The adjustable carriage slide 26 is secured at the desired position on the adjustable carriage bar 18 by the thumb screw 22 (not shown in FIG. 2), and the end blocks 12 are slipped over the ends of the said bar 18. The J hooks 14 are then secured to the frame of the bed 42 by means of the wing nuts 16. The traction device 10 is then clamped to a traction coupling unit 32 by wing nut 34 which fits over a threaded stud 38 which is part of the said traction device 10. The safety nut 30 is removed from adapter bar 28 and the said adapter bar is passed through the coupling unit 32 and clamped in position by a thumb screw 36. The short, bent end of the adapter bar 28 is then fastened in the end hole 27 of the adjustable carriage slide 26 and the unit is ready for the application of traction through cable 44. To attach the device to a litter with side poles, it is merely necessary to lengthen the adjustable carriage bar 18 with the extension 19 and swivel the J hooks in the end blocks to the desired position and secure said hooks with wing nuts as described for a bed. Since the hooks will fit over either round or square tubing, the device can be attached to bed springs or any other supporting structure, whether it be horizontal, vertical or at an angle.

From the foregoing description, it is apparent that this novel and useful improvement on my co-pending applications for a portable surgical traction device meets the objectives set for it, and that the invention fills a real need for such a device in the medical field, especially in the transportation of surgical cases.

Although the invention has been described with reference to a particular embodiment, it will be understood to those skilled in the art that the invention is capable of a variety of alternative embodiments within the spirit and scope of the appended claims.

I claim:

1. A mounting means for securing a surgical traction device to a structure, said means comprising a horizontally oriented bar, a pair of blocks mounted for slidable movement on said bar, means mounted in each of said pair of blocks operable to cause a binding action between said blocks and said bar for inhibiting the slidable movement of said blocks, a hook swivelably mounted in each of said blocks, means on each hook for adjusting the extension thereof from said blocks such that each of said hooks and its block may be tightly engaged with a structure such that said horizontally oriented bar is supported parallel with said structure, a third block mounted for slidable movement on said horizontal bar, means mounted in said block to cause a binding action between said block and said bar to inhibit the slidable movement of said third block and a second bar adjustably secured to said third block for supporting a surgical traction device.

2. Means for attaching a surgical traction device to a structure comprising a horizontal bar, a pair of blocks mounted for slidable movement on said bar, thumb screws threadable through each of said blocks to engage said bar in order to lock said blocks at any position on said bar, a pair of hooks each having a threaded straight portion and a curved hook portion, a hole through each of said blocks for receiving the straight portion of said hooks, a wing nut in engagement with the threaded straight portion of each of said hooks for clamping a structure between said hook portions and said blocks such that said horizontal bar is supported parallel to said structure, a third block mounted for slidable movement on said bar, a thumb screw in said block for engaging said bar for locking said block at any position on said bar, and a second bar adjustably secured to said third block for supporting a traction device.

References Cited in the file of this patent

UNITED STATES PATENTS

| | | |
|---|---|---|
| 1,296,128 | Siebrandt | Mar. 4, 1919 |
| 1,964,930 | Siebrandt | July 3, 1934 |
| 2,529,173 | Moyer | Nov. 7, 1950 |
| 2,550,983 | Ettinger | May 1, 1951 |
| 2,630,995 | Carlson | Mar. 10, 1953 |
| 2,865,585 | Beyer | Dec. 23, 1958 |
| 3,009,461 | Collins | Nov. 21, 1961 |

OTHER REFERENCES

Zimmer's Catalogue of Orthopedic and Fracture Equipment, page 812 of "Bucks Extension Apparatus."